United States Patent [19]
Zepp

[11] 3,734,314
[45] May 22, 1973

[54] METHODS OF AND APPARATUS FOR TRANSFERRING BODIES

[75] Inventor: Philip H. Zepp, North Canton, Ohio

[73] Assignee: The Hoover Company, North Canton, Ohio

[22] Filed: Sept. 3, 1970

[21] Appl. No.: 69,369

[52] U.S. Cl..................214/38 R, 29/205, 104/113, 104/131, 105/238 R, 105/356, 214/356, 295/1
[51] Int. Cl..............................................B65g 67/00
[58] Field of Search ..................214/38 R, 41, 44 R, 214/152; 198/50; 104/113, 131; 105/356; 295/1; 29/205; 206/46 H, 65

[56] References Cited
UNITED STATES PATENTS

| | | |
|---|---|---|
| 2,363,487 | 11/1944 | Anderson..........................198/50 X |
| 231,089 | 8/1880 | Prosser................................105/356 |
| 2,512,622 | 6/1950 | Fish................................206/46 H X |
| 1,883,964 | 10/1932 | Kramer................................104/131 |
| 3,318,261 | 5/1967 | Garcia............................104/131 X |
| 3,407,926 | 10/1968 | Rosser....................................206/65 |

Primary Examiner—Robert G. Sheridan
Attorney—Alfred G. Gross and Gerald H. Kreske

[57] ABSTRACT

Methods of and apparatus for transferring bodies between work stations by supporting each body in a circular transfer member which rolls under the influence of gravity between work stations along a downwardly inclined track. Means are provided for inserting and removing a body from its transfer member at a work station and means are also provided for elevating each member to compensate for the vertical component of gravitational movement thereof along the downwardly inclined track.

13 Claims, 10 Drawing Figures

Patented May 22, 1973

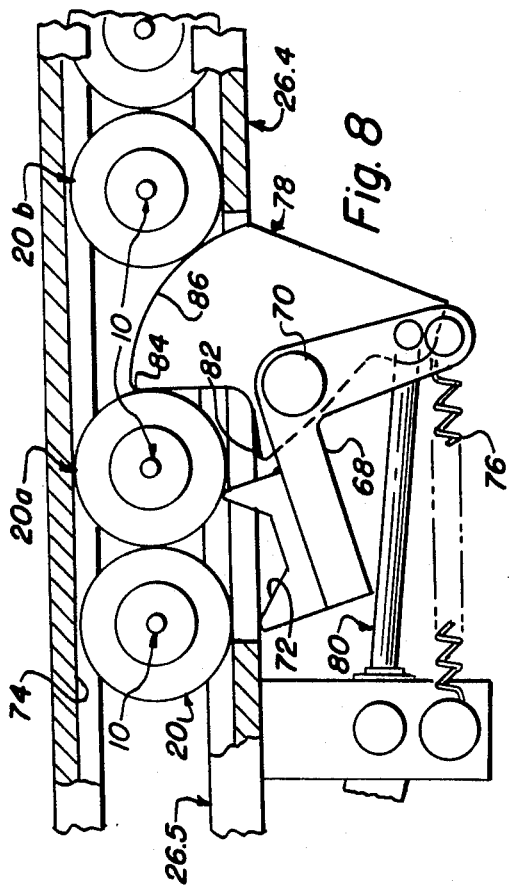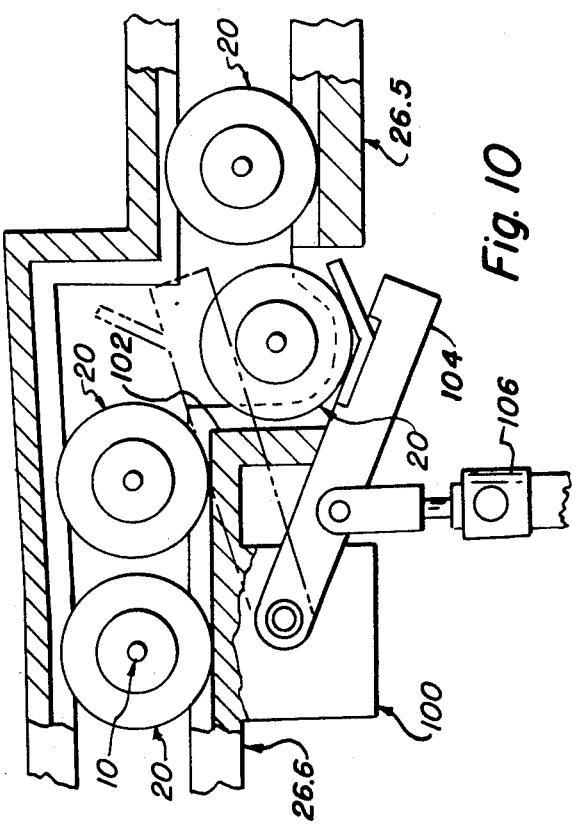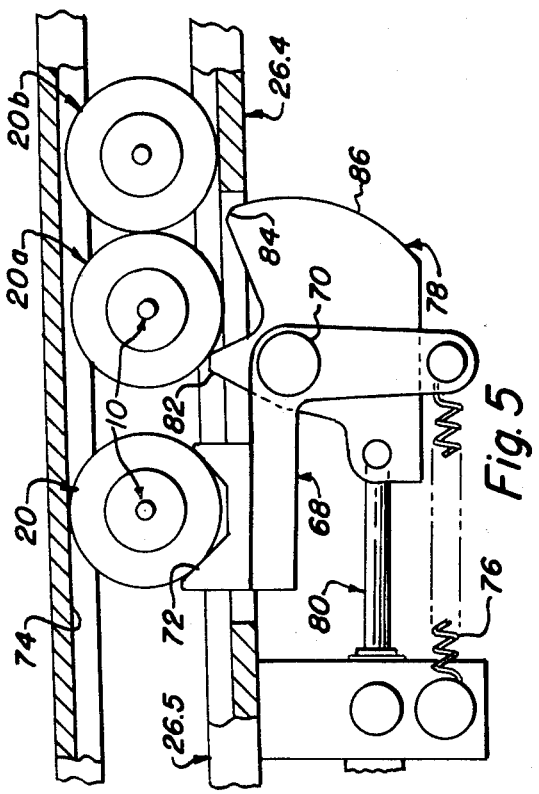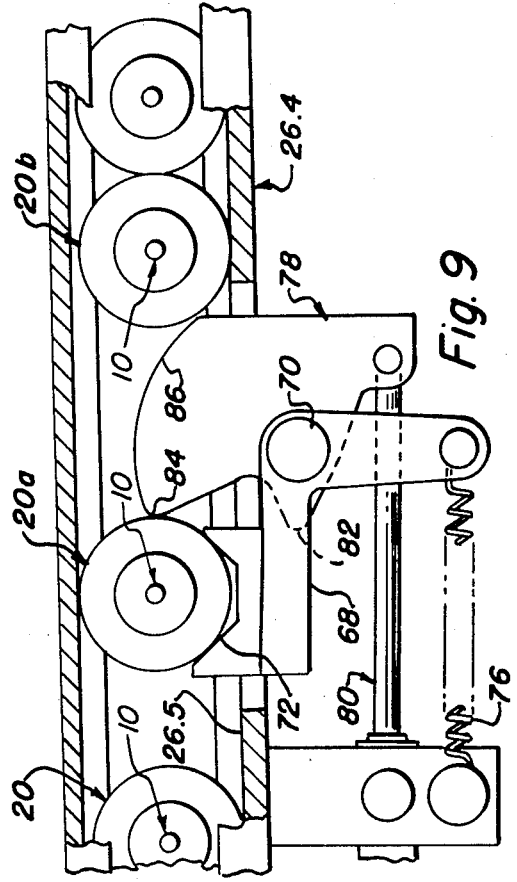

3,734,314

METHODS OF AND APPARATUS FOR TRANSFERRING BODIES

BACKGROUND AND SUMMARY

The present invention relates to methods of and apparatus for transferring bodies between spaced-apart stations and the principal object of the present invention is to provide new and improved methods and apparatus of the character described.

It has long been common practice, when rollable bodies are to be transferred between spaced-apart stations where the bodies are to be processed or the like, to roll such bodies along a downwardly inclined track. When such bodies are not freely rollable, a conveyor is usually provided for transferring such bodies between the stations. While the use of a conveyor is advantageous in that gravity need not be relied upon to maintain the bodies in motion, it is quite disadvantageous in that conveyors are complex, costly and require frequent maintenance.

The present invention makes possible the gravity transfer of bodies which are not freely rollable by the expedient of removably disposing such bodies within transfer members which are freely rollable. The present invention provides for insertion of a body to be transferred into a transfer member which has a circular outer periphery, the gravity transfer of such member along a downwardly inclined path, the removal of such body, when necessary, from the transfer member at a work station where certain processing operations may be performed on the body, and the re-insertion of the body into the transfer member for subsequent gravitational movement, as to another station.

Since it is usually impractical to set up a series of work stations which successively receive bodies along an unbroken, downwardly inclined path, the present invention provides for disposition of the stations for receipt of successive bodies at substantially the same height and provides for gravitation of the bodies between the stations by periodically elevating such bodies to a height to compensate for the vertical component of body gravitational movement.

The advantages of the invention will readily become apparent from a study of the following description and from the appended drawings.

DRAWING DESCRIPTION

In the drawings accompanying this specification and forming a pair of this application, there is shown, for purpose of illustration, an embodiment which the invention may assume, and in these drawings:

FIG. 1 is a fragmentary, broken perspective view of apparatus illustrating the present invention, FIG. 2 is a small scale, generally diagrammatic view of apparatus further illustrating the invention, FIG. 3 is an enlarged view of certain apparatus seen in FIG. 2, portions on the near side being removed to show the underlying structure, FIG. 4 is an enlarged sectional view, partially broken away on the near side, and generally corresponding to the line 4—4 of FIG. 2, FIG. 5 is a fragmentary view generally corresponding to the line 5—5 of FIG. 4 and with portions on the near side broken away, FIGS. 6 and 7 are fragmentary views similar to FIG. 4 but showing certain parts in other operating positions, FIGS. 8 and 9 are fragmentary views similar to FIG. 5 but showing certain parts in other operating positions, and FIG. 10 is a side elevational view of a detail with portions on the near side broken away.

DETAILED DESCRIPTION

The problem solved by the present invention is the economical, automated, successive transfer of electric motor armatures to various work stations where certain operations, forming no part of this invention, are performed thereon. Accordingly, the invention will hereinafter be described in connection with the transfer of such armatures; however, it will be understood that the invention may find utility in other fields and that the disclosure herein of its use with electric motor armatures is for convenience only and is in no way a limitation.

Figure 1:
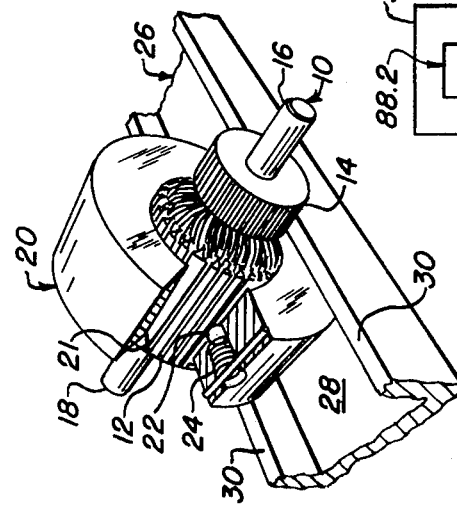

With reference to FIG. 1, the reference character 10 denotes an electric motor armature of the usual type having, for example, a radially enlarged, intermediate laminated body portion 12 with its usual peripheral, longitudinally extending winding slots, a commutator 14, and oppositely extending shaft portions 16 and 18. In the manufacture of such an armature, many successive operations must be performed thereon as will be understood by those skilled in the art.

For example, the laminated body 12 and the commutator 14 must be affixed to the shaft, insulation must be placed in the lamination slots, and windings must be disposed in the insulated lamination slots and suitably anchored with the windings properly connected to the commutator segments. The completed armature must be electrically tested, the commutator must be trued to minimize radial runout during rotation, and in many instances the assembly must be balanced for smooth, high speed rotation.

The many steps hereinabove enumerated are normally performed at different machines, or stations, between which the armatures must be transferred, and modern production techniques require the constant and reliable flow of armatures between the stations without human attention and by means not likely to malfunction or require constant attention to keep in good working order.

While attempts have been made to roll the armatures between the work stations along their extending shaft portions 16, 18, this has not been successful because the small diameter of the shaft portions made rolling of the armature difficult. The problem is compounded by the tendency of the armature to become skewed relative to its travel path and the necessity of avoiding any damage to the armature as it travels between the stations and is shifted toward and away from operative relation therewith.

Since the armature itself cannot reliably be rolled between stations, the present invention contemplates the detachable association of such armature with a member which can, however, reliably be rolled along a desired path and which can resist necessary handling forces.

Still referring to FIG. 1, the armature 10 is shown disposed within a tubular transfer member 20 having a circular outer periphery, a bore 21 for slidably receiving the laminated body portion 12 of the armature, and a length but slightly less than that of such body portion. Any suitable means may be provided to yieldably retain the armature within the member 20 and as herein shown, a ball 22 is contained in a transverse bore in the member 20 and is urged radially inwardly to abutment with the armature body portion 12 by a compression spring 24. Although not shown, the inner end of the ball-receiving bore may be slightly necked down to prevent expulsion of the ball into the armature-receiving bore 21 of the member 20 when the armature is removed from the member bore.

Means are provided along which transfer members 20 and their contained armatures may roll and as herein disclosed, such means comprises a track 26 which is channel-like in cross section. Such track provides a floor 28 along which each member 20 may roll and spaced, upstanding flanges 30 which closely receive the members therebetween and confine them against lateral displacement. As will later appear, track 26 extends between the various work stations and provides a path along which the transfer members gravitate.

Figure 2:
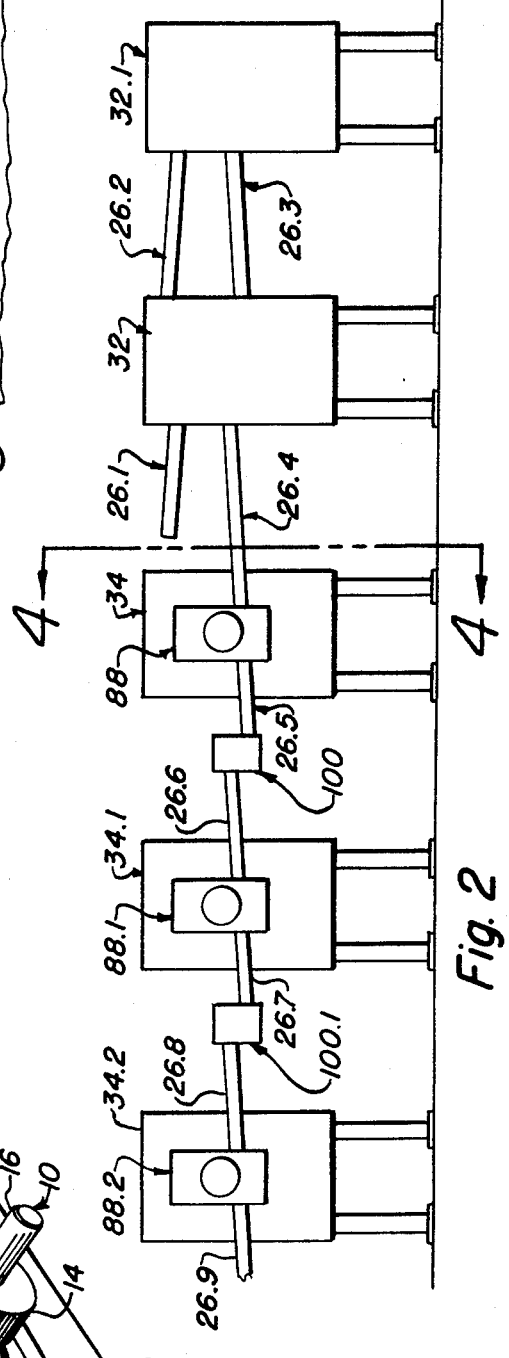

Turning now to FIG. 2, the reference characters 32, 32.1 represent work stations which, for example, automatically place the armature windings in the armature laminated body portion 12. Since this operation is somewhat slower than most succeeding operations, two of what will hereinafter be referred to as winding stations are provided.

Leading to the winding station 32 is a downwardly inclined upper track 26.1 which may be similar to track 26 hereinabove described in association with FIG. 1. Leading from the station 32 to the winding station 32.1 is a downwardly inclined upper track 26.2 which again may be similar to track 26. Leading from the winding station 32.1 back to the station 32 is a downwardly inclined track 26.3 and leading from the station 32 to a work station 34 is a track 26.4. Tracks 26.3 and 26.4, of course, are similar to the track 26 previously described.

Figure 3:
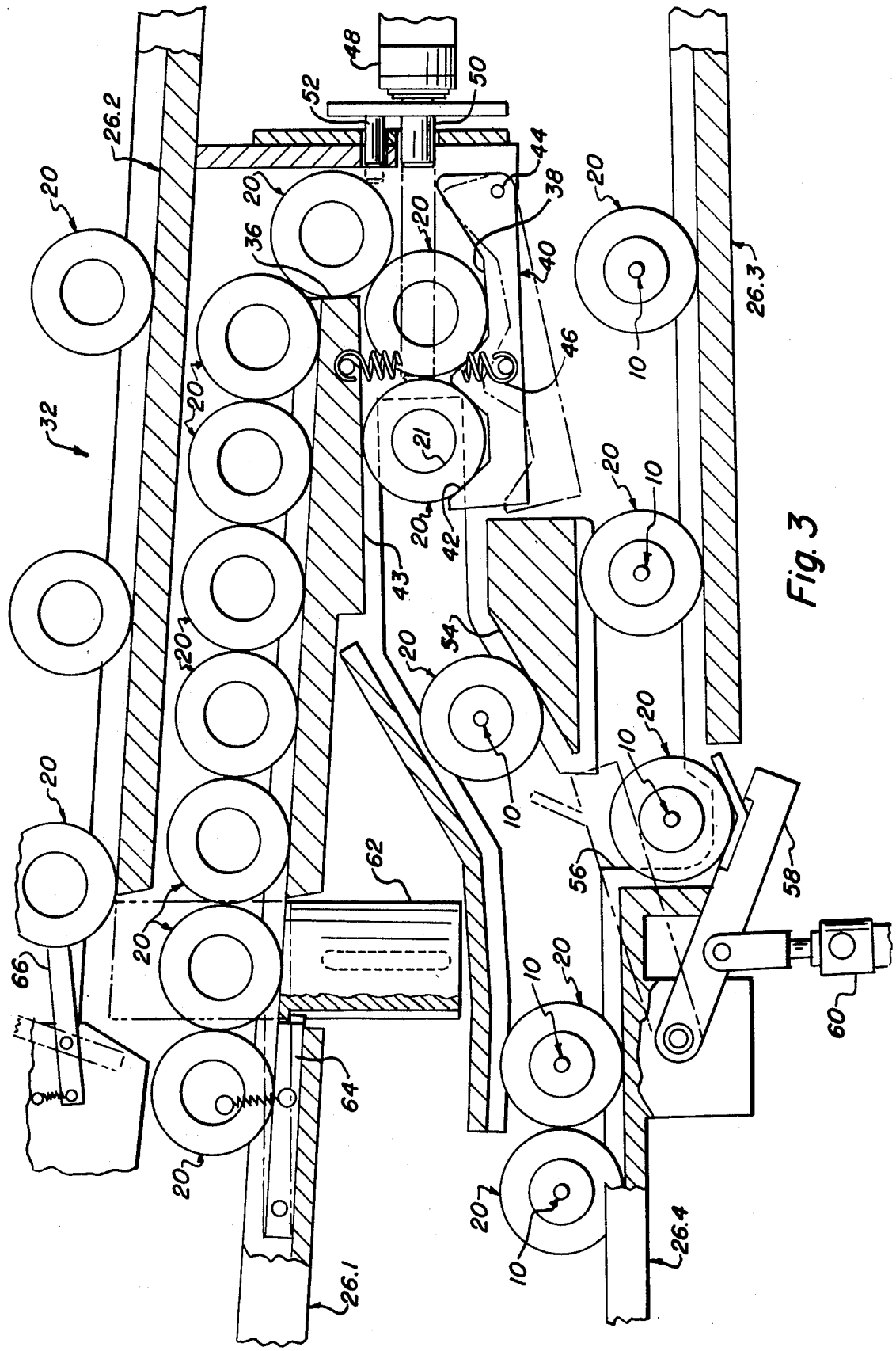

Associated with the station 32 is transfer member handling apparatus which is shown in detail in FIG. 3. As therein shown, track 26.1 terminates at 36 above the pocket 38 of an underlying detent member 40. In the position of parts shown, detent member 40 also has a pocket 42 to the left of pocket 38, pocket 42 being proportioned to cooperate with an overlying portion 43 of track 26.1 to accurately locate a transfer member 20 relative to the winding station 32. Detent member 40 is pivoted about an axis 44 and a tension spring 46 yieldably retains the detent member in its full line position shown for a purpose to appear.

Empty transfer members are adapted to gravitate to the right along track 26.1 with the foremost member being received in the pocket 38 of the detent member 40 and with subsequent transfer members accumulated therebehind. When the winding station 32 has completed its operation on an armature (such armature having been fed to the station by any suitable means forming no part of the present invention) such armature will be inserted axially into an empty transfer member located in the detent member pocket 42.

After disposition of the armature into the transfer member as above described, operation of a fluid cylinder 48 will be initiated by any conventional means. During such operation of this cylinder, its piston rod 50 will be extended to urge the empty transfer member in the detent pocket 38 to the left. At the same time, a pin 52 will be moved from its full to its phantom line position to prevent gravitation of the next in line transfer member.

As the transfer member in the detent pocket 38 is moved to the left by the extending piston rod 50, it will force the now-loaded transfer member from the detent member pocket 42 to the left and down a short incline 54 while the empty transfer member assumes its place in the detent member pocket 42. During such movement of the two transfer members, the detent member will, of course, spring to its phantom line position and then return under the impetus of spring 46 to trap the empty transfer member in the detent pocket 42. Retraction of the piston rod 50 and the pin 52 will now be effected to allow the next in line transfer member to gravitate into the detent pocket 38 to await transfer to the detent pocket 42.

At the lower end of the short incline 54, there is provided a pocket 56 which forms the lower terminus of the track 26.3 from the station 32.1. Pivotally mounted at such pocket is an arm 58 which is periodically shifted between its full and phantom line positions by a fluid cylinder 60. With the arm 58 in its full line position, it is adapted to receive a loaded transfer member from either the incline 54 or from the track 26.3.

If a transfer member 20 is seated on the full line positioned arm 58 at the time a transfer member rolls down the incline 54, such last-mentioned transfer member will be deflected to pass down the track 26.4 and to the station 34. On the other hand, if no transfer member is seated on the arm 58 in its full line position, a transfer member will gravitate from the incline 54 to the pocket 56 for seating in the arm 58.

As previously stated, the cylinder 60 will momentarily and at periodic intervals raise the lever 58 to its phantom line position and, if a transfer member is at such time seated thereon, such transfer member will be raised to the track 26.4 for subsequent gravitation to the station 34.

Whenever the track 26.1 becomes full of unloaded transfer members, such condition being signaled by a suitable limit switch or the like (not shown), an elevator 62 will be raised form its full to phantom line position by any suitable means, not shown, thus discharging a transfer member resting thereon to the track 26.2 for gravitation to the station 32.1. A spring-loaded latch member 64 arrests motion of the "upstream" transfer members when elevator 62 raises and a spring-loaded kicker 66 pushes a transfer member from the raised elevator onto the track 26.2.

Although not shown, it will be understood that mechanism similar to that seen in FIG. 3 will likewise be provided at station 32.1; however, there will be no upper track along which transfer members may gravitate away from the station and thus the elevator hereinabove described will be omitted. Moreover, there will be no lower track, corresponding to track 26.3, along which loaded transfer members may gravitate to the station 32.1. Stated alternatively, station 32.1 will be provided only with the upper track 26.2 along which empty transfer members may gravitate thereto from the station 32 and a lower track 26.3 along which loaded transfer members may gravitate therefrom to the station 32 for elevation to the track 26.4 and subsequent gravitation to the station 34.

Figure 4:
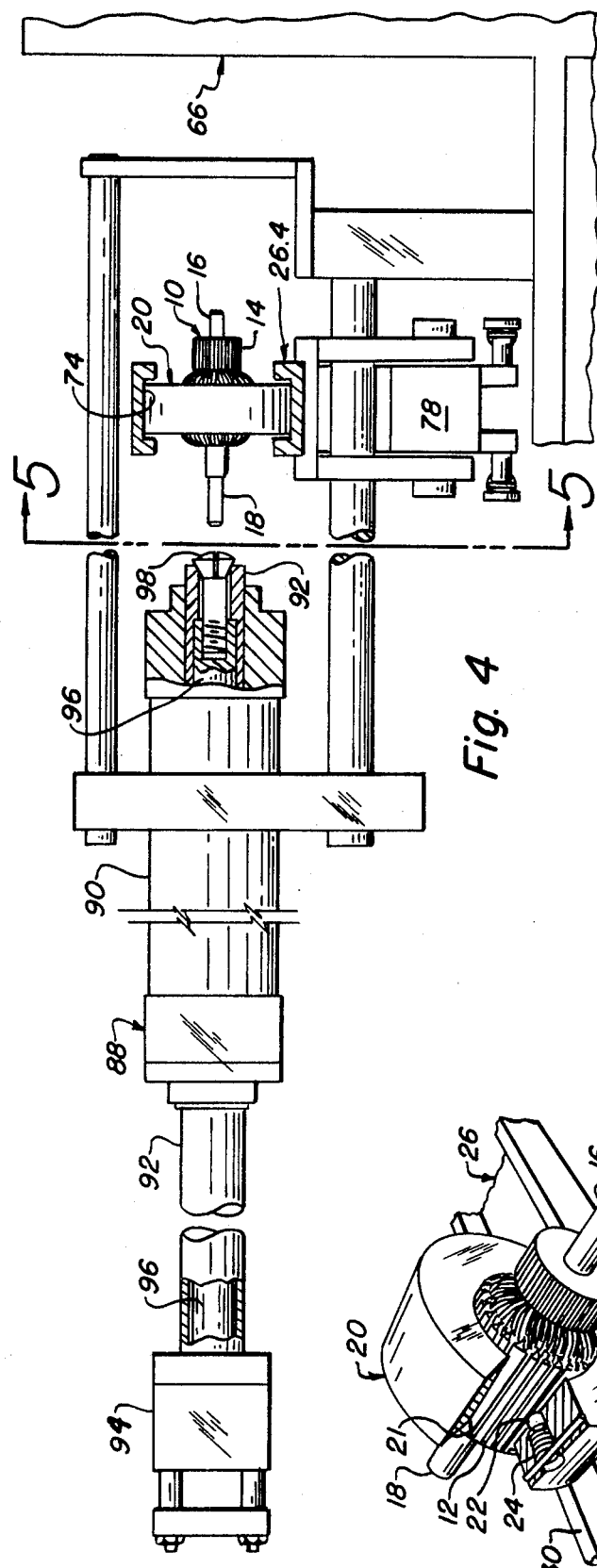

Turning now to work station 34 illustrated in FIG. 2, the structure seen in FIGS. 4 and 5 will be disposed thereat. At such work station, suitable apparatus 66 is provided for performing the next required operation on the armatures 10 delivered from the winding stations 32, 32.1. Since apparatus 66 forms no part of the present invention, it has not been illustrated in detail; however, such apparatus could, for example, perform the function of making the requisite electrical connections between the armature windings and the commutator.

With reference first to FIG. 5, a detent arm 68 is provided for accurately locating and yieldably retaining a transfer member 20 in precise alignment with the previously mentioned apparatus 66. Detent arm 68 is pivoted about an axis 70 and has a pocket 72 cooperable with an overlying track 74 to precisely locate the transfer members above described. A tension spring 76 yieldably biases the detent arm to the position illustrated.

Also pivoted on the axis 70 is an indexing arm 78 to which is attached a fluid cylinder 80. Arm 78 has a stop portion 82 for interrupting gravitational movement of the transfer members along the track 26.4 and a kicker portion 84 having an arcuate surface 86, both for a purpose to appear. Assuming that the transfer member 20 shown in the detent arm pocket 72 contains an armature which has been discharged from the apparatus 66, the next adjoining transfer member (identified as 20a) will be moved into the detent arm pocket in the following manner:

The fluid cylinder 80 will be actuated to shift the indexing arm 78 from the position seen in FIG. 5 through the position seen in FIG. 8 to the position seen in FIG. 9. As the arm 78 moves to the position of FIG. 8, the stop portion 82 will be withdrawn from in front of the transfer member 20a to allow it to gravitate to abutment with the transfer member 20 while the arcuate portion 86 of the detent arm moves in front of the next transfer member (identified as 20b) to retain it in the position illustrated.

Continued rotation of the indexing arm will cause its kicker portion 84 to force the transfer member 20a into the detent arm pocket 72 (see FIG. 9) while the transfer member 20 is forced out of such pocket for gravitation down a track 26.5 which is a continuation of track 26.4. As the transfer member 20 is forced out of the detent arm pocket, such arm will spring to the position seen in FIG. 8 and, upon alignment of the transfer member 20a with such pocket, springs 76 will return detent arm 68 to the position seen in FIGS. 5 and 9. Cylinder 80 will next be actuated to return the indexing arm 78 to the position seen in FIG. 5 to await the next transfer member indexing operation.

Armature shifting means 88 is provided at station 34 for shifting an armature 10 axially out of its transfer member 20 while the latter is accurately located by the means disclosed in FIGS. 5, 8 and 9 and for moving such armature to operative relation with the armature processing apparatus 66. Such means also shifts the armature axially into its transfer member once again when apparatus 66 has performed its designed function on the armature.

With reference to FIG. 4, a fluid cylinder 90 is mounted in axial alignment with the bore of a transfer member 20 when the latter is seated in the pocket 72 of the detent arm 68. Such cylinder has a piston rod 92 extending from respective ends thereof and, for a purpose to appear, such piston rod is hollow. Secured to the left end of piston rod 92 for movement therewith is a fluid cylinder 94 having a piston rod 96 extending axially of and within the hollow piston rod 92. Threaded into or otherwise secured to the free or right end of piston rod 96 is a collet 98.

The arrangement is such that when cylinder 94 moves piston rod 96 to the right relative to the piston rod 92, the collet 98 will open to slidably receive the end 18 of the armature shaft. When, however, the piston rod 96 is moved to the left relative to the piston rod 92, the collet 98 will grip such armature shaft end (assuming, of course, such shaft end is disposed within the collet) for a purpose to appear.

With a transfer member accurately located by the previously described detent arm 68, the structure seen in FIG. 4 will be in the position shown, it being understood that piston rod 96 has been extended by its cylinder 94 to open the collet 98 while piston rod 92 has been retracted by its cylinder 90.

Figure 6:
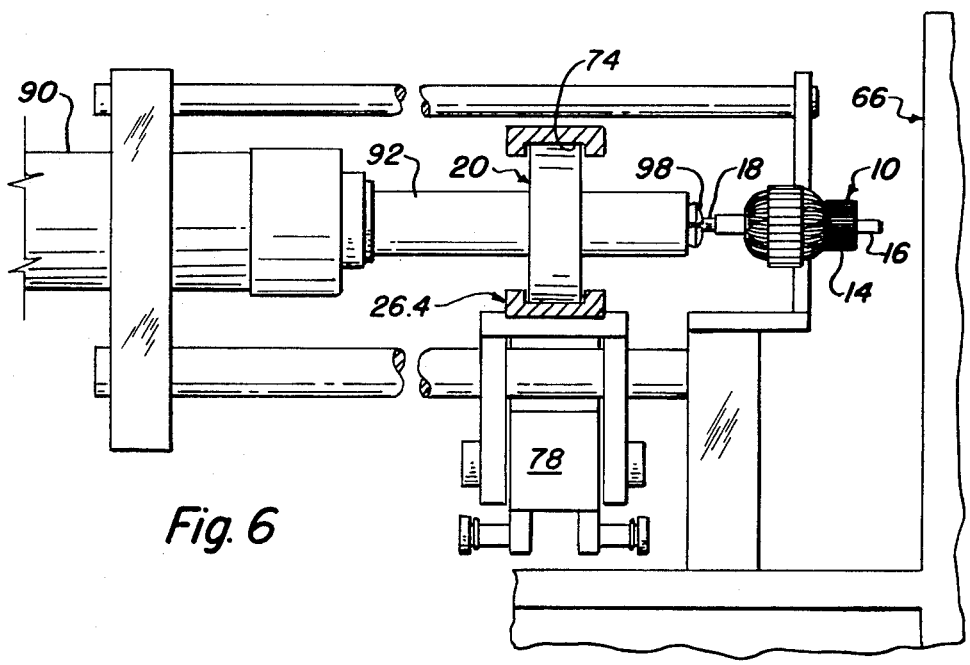

When an armature 10 is to be shifted to the apparatus 66, cylinder 90 will be actuated to extend its piston rod 92 from the position shown in FIG. 4 to the position seen in FIG. 6. As the piston rod 92 moves to the right as above described, the shaft end 18 of the armature will enter the open collet 98 aligned therewith and bottom against an abutment (not shown) within the collet. Further movement to the right of the piston rod will shift the armature axially from its transfer member 20 where it may be gripped by suitable means (not shown) forming a part of the apparatus 66. Upon delivery of the armature to the apparatus 66, the piston rod 92 may, if desired, be returned to its retracted position seen in FIG. 4.

Figure 7:
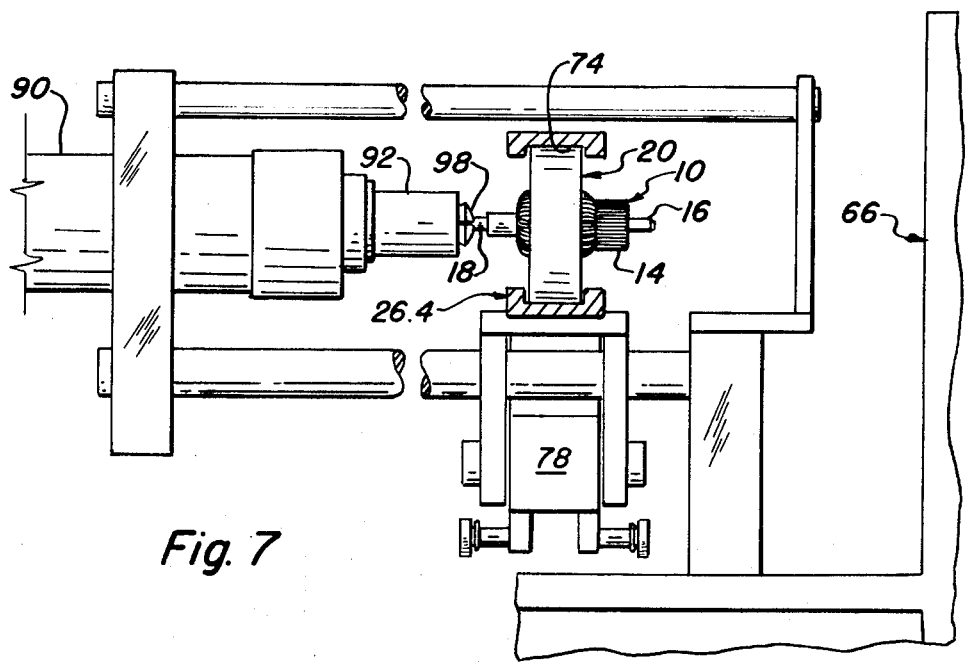

When apparatus 66 has completed its work cycle upon the armature, it will return the latter to the position of FIG. 6 and, if the piston rod 92 was retracted, it will once again be extended through the transfer member 20 to the position of FIG. 6 with the armature shaft end 18 disposed within the collet 98. Fluid cylinder 94 will now be actuated to cause the collet to grip the armature shaft end disposed therein and the cylinder 90 will next be actuated to retract the piston rod 92 to the position of FIG. 7 wherein the armature 10 is once again disposed within the transfer member 20. With the parts positioned as seen in FIG. 7, cylinder 94 will be actuated to cause the collet to release the armature shaft whereupon the piston rod 92 will be retracted by the cylinder 90 to the position of FIG. 4 once again.

With the armature thus re-inserted within the transfer member 20, the sequence of events seen in FIGS. 5, 8 and 9 will take place as previously described. Thus, the transfer member 20 will be discharged for gravitation down the track 26.5 and the next transfer member (20a as previously described) will be positioned for removal of its armature and transfer thereof to the apparatus 66 by the armature-shifting means 88 hereinabove described.

Referring once again to FIG. 2, work stations 34.1 and 34.2 are shown disposed adjacent work station 34 for successively receiving the transfer members 20 and for performing certain operations (which form no part of the present invention) upon the armatures 10 carried thereby. It is to be understood that the work station 34.1 includes armature-shifting means 88.1 which may be identical to the means 88 previously described in connection with station 34, while the station 34.2 includes similar armature-shifting means 88.2. Of course, each of the stations 34.1 and 34.2 also includes the transfer member locating an indexing mechanism seen in FIGS. 5, 8 and 9.

Extending through the work station 34.1 is an inclined track identical to that previously described and, in the position of parts shown, such track providing an upper right-hand section 26.6 along which the transfer members may gravitate thereto, and a lower left-hand section 26.7 along which the transfer members may gravitate therefrom. Similarly, and extending through the work station 34.2, is an inclined track providing an upper righthand section 26.8 and a lower left-hand section 26.9.

It is highly desirable that the elevation at which the armatures are unloaded and loaded at each of the stations 34, 34.1 and 34.2 be substantially identical. Thus, standard armature processing machines or apparatus may be employed at each of the stations without necessitating the use of mounting pits or elevated platforms and all of such machines may be disposed at a normal, easily accessible height for maintenance and repair.

With each of the work stations 34, 34.1 and 34.2 at the same level as above pointed out, however, it will be evident that for a transfer member to gravitate between adjoining stations, means must be provided to elevate each transfer member an amount to compensate for the vertical component of member gravitational movement. As seen in FIG. 2, means 100 is shown interposed between work stations 34 and 34.1 and similar means 100.1 is shown interposed between work stations 34.1 and 34.2.

Referring to FIG. 10 wherein means 100 is illustrated in some detail, it will be seen that the lower, left end of track section 26.5 terminates in a pocket 102 while the upper, right end of track section 26.6 inclines downwardly from above pocket 102 to the work station 34.1. The vertical height between the left end of track section 26.5 and the right end of track section 26.6 is precisely that required to compensate for the inclination of the track sections 26.5 and 26.6.

Still referring to FIG. 10, an arm 104 is pivotally mounted for movement between its full and phantom line positions by a fluid cylinder 106. With the arm 104 in its full line position, it is adapted to receive a transfer member 20 as it rolls down the track section 26.5. Any suitable means may activate the fluid cylinder 106 to shift the arm 104 to its phantom line position upon gravitation of a transfer member thereonto. Alternatively, cylinder 106 may merely be actuated periodically, if desired. When the arm is shifted to its phantom line position, the transfer member disposed thereon will be raised to the track section 26.6 for gravitation to the work station 34.1. The cylinder 106 will next lower the now-empty arm 104 to its full line position to await arrival of the next transfer member 20.

It is to be understood that the means 100.1 functions in the same manner as means 100 to raise each transfer member 20 between the lower end of track section 26.7, to which each loaded transfer member 20 gravitates after its discharge from the work station 34.1, and the upper end of track section 26.8 for transfer member gravitation to the work station 34.2.

While only three work stations 34, 34.1 and 34.2 have been shown, it will be understood that a greater or lesser number may be employed as required. After discharge from the last work station, such as, for example, work station 34.2, each transfer member 20 will gravitate down track section 26.9 to a place, not shown, whereat the armature will be removed therefrom by means which may be similar to that shown in FIG. 4. The then-empty transfer members may next be returned for deposit in the track section 26.1 (FIG. 2), for a repetition of the cycle of operations described.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the hereindisclosed embodiment is illustrative only and that my invention is not limited thereto.

I claim:

1. In apparatus for transferring a body toward a work station, the improvement comprising
   a transfer member having a circular outer periphery along which it may roll and an axially extending opening for removably receiving said body,
   a downwardly inclined track extending to said work station and providing a path along which said transfer member rolls,
   and means interrupting movement of said transfer member when it is disposed in predetermined relation with said work station.

2. The structure of claim 1 wherein said track has laterally directed portions cooperable with corresponding portions of said member to confine the latter to movement along said path.

3. The structure of claim 1 and further comprising means adjacent said station for removing said body from said transfer member in a direction axially thereof and for shifting said body to predetermined relation with said station.

4. In apparatus for transferring a body toward a work station, the improvement comprising
   a transfer member having a circular outer periphery along which it may roll and an axially extending opening for removably receiving said body,
   a downwardly inclined track extending to said work station and providing a path along which said transfer member rolls under the influence of gravity,
   and means adjacent said work station for removing said body from said transfer member in a direction axially thereof and for shifting said body to predetermined relation with said work station.

5. The structure of claim 4 wherein said means also shifts said body from predetermined relation with said work station and inserts said body into said transfer member in a direction axially thereof.

6. In apparatus for transferring a body between a pair of spaced-apart stations which successively receive said body at similar heights, the improvement comprising
   a transfer member having a circular outer periphery along which it may roll and an axially extending opening, said member opening removably receiving said body whereby the latter and said transfer member are unitarily movable,
   track means extending between said stations and providing a downwardly inclined path along which said transfer member rolls under the influence of gravity,
   means adjacent said path for elevating said transfer member to a height to compensate for the vertical component of gravitational movement of the latter along said path, and means adjacent one of said stations for removing said body from said transfer member in a direction axially thereof and for shifting said body to predetermined relation with said station.

7. The structure of claim 6 wherein said means also shifts said body from predetermined relation with said station and inserts said body into said transfer member in a direction axially thereof.

8. The structure of claim 7 and further comprising means at said one station for interrupting movement of said transfer member when it is disposed in predetermined relation with said station.

9. In the art of transferring a body toward a work station, the improved method which comprises inserting the body within an apertured transfer member having a circular outer periphery, rolling said transfer member on its periphery aforesaid along a predetermined path to said work station, and removing said body from said transfer member at said work station to permit processing of said body.

10. The method of claim 9 which comprises inserting said body into and removing said body from said member in a direction axially of the latter.

11. The method of claim 9 which comprises rolling said transfer member by gravitational movement along a downwardly inclined path to said work station.

12. In the art of transferring a body between a pair of spaced-apart stations which successively receive said body at similar heights, the improved method which comprises inserting said body at one of said stations within an apertured transfer member having a circular outer periphery, rolling said transfer member by gravitational movement on its periphery aforesaid along a predetermined, downwardly inclined path to the other of said stations, elevating said transfer member to a height to compensate for the vertical component of gravitational movement of said member along said path, and removing said body from said transfer member at said other station.

13. The method of claim 12 which comprises interrupting gravitational movement of said transfer member at a place intermediate said stations, and elevating said transfer member for purpose aforesaid at said place.

* * * * *